Patented Jan. 12, 1926.

1,569,692

UNITED STATES PATENT OFFICE.

EMILE VAN WEYENBERGH, OF CLAPHAM, LONDON, ENGLAND, ASSIGNOR TO COURTAULDS LIMITED, OF LONDON, ENGLAND.

PREPARATION OF ALKALI CELLULOSES.

No Drawing.   Application filed March 6, 1925.   Serial No. 13,652.

*To all whom it may concern:*

Be it known that I, EMILE VAN WEYENBERGH, a subject of the King of the Belgians, residing at 125 Elms Road, Clapham, in the county of London, England, have invented new and useful Improvements in or Relating to the Preparation of Alkali Celluloses, of which the following is a specification.

This invention relates to the preparation of alkali celluloses and consists in an improved process for preparing alkali celluloses containing a comparatively high percentage of caustic soda and a low percentage of water, (e. g., caustic alkali at least 30% by weight, and water, not more than about 35% by weight) such as are required for example in the preparation of certain cellulose derivatives, for instance cellulose ethers, but they may also be used for any other suitable purpose.

Such alkali celluloses have hitherto been prepared for example either (1) by steeping the cellulose at room temperature in a solution of caustic soda, pressing the mass to the required degree and then removing the excess of water by evaporation under reduced pressure, or (2) by grinding together in a suitable mill the required proportions of cellulose and solid caustic soda, any water required being added, or absorbed from the atmosphere, during the grinding operation.

According to the present invention the cellulose is steeped for a short time in an excess of strong hot caustic alkali solution, containing more than 55% by weight of caustic alkali at a temperature not lower than 40° C., and then while still maintaining a raised temperature removing by pressure any large excess of caustic alkali from the alkali cellulose. For instance the cellulose is steeped for a short time, say up to 20 minutes, in an excess of a solution containing about 55 to 75 per cent by weight of caustic soda and at a temperature of about 50 degrees to 90 degrees centigrade. The excess of caustic soda solution is removed by pressing the mass until it is about three times the weight of the dry cellulose it contains. The temperature is maintained at from 50 degrees to 90 degrees centigrade during the pressing after which the mass is allowed to cool, when it forms a solid cake having the composition:—caustic soda 40 to 50 per cent, cellulose 30 to 35 per cent, water 20 to 25 per cent; by weight.

The following is an example showing how this invention may be carried into effect, but the invention is not limited to this example.

100 parts by weight of cotton-wool are quickly immersed in an excess of an approximately 60 per cent solution of caustic soda maintained at 65 degrees centigrade and after remaining immersed for five minutes, the cotton is removed from the hot solution and immediately pressed, whilst still hot, to three times the original weight of the cotton-wool. The resulting alkali cellulose has the following approximate composition:—caustic soda 45 per cent, cellulose 32 per cent, water 23 per cent.

This alkali cellulose can be readily disintegrated before use if required.

It is generally preferred to carry out the steeping of the cellulose so that exposure of the alkali cellulose to air is avoided as far as possible. The time of steeping may then be longer than is the case when air is allowed to come into contact with the alkali cellulose.

Although the temperature and concentration of the caustic soda solution are both high, we have found that, whilst getting a uniform and complete penetration of the cellulose fibres by the caustic soda, the loss of cellulose is only very slight provided the time occupied by the hot steeping and pressing is kept short and that excessive contact between the air and the cellulose is avoided during the said hot steeping and pressing processes.

Owing to their high alkali content the alkali celluloses prepared according to the present invention are not suitable for the commercial manufacture of viscose.

What I claim is:

1. A process for the production of alkali cellulose containing not less than 30% by weight of caustic alkali, and not more than about 35% by weight of water, which consists in steeping the cellulose in a solution containing more than 55% by weight of caustic alkali at a temperature of at least approximately 40° C. but not high enough to detrimentally affect the cellulose, and then removing the excess caustic alkali solution while maintaining a raised temperature.

2. A process for the production of alkali cellulose which consists in quickly immersing 100 parts by weight of cotton wool in an excess of an approximately 60% solution of caustic soda maintained at a temperature of approximately 65° C., removing the cotton from the solution after approximately five minutes immersion, and pressing the same, while still hot, to approximately three times the original weight of the cotton wool.

3. The method of preparing alkali cellulose which comprises the step of steeping the cellulose in an excess of strong hot caustic alkali solution until the cellulose is penetrated by the latter, and promptly pressing excess solution from the cellulose while the latter is still hot.

4. The method of preparing alkali cellulose which comprises the step of steeping the cellulose in an excess of strong hot caustic alkali solution until the cellulose is penetrated by the latter, and promptly pressing excess solution from the cellulose while the latter is still hot, and preventing excessive contact between the air and the cellulose during said steps.

In testimony whereof I have signed my name to this specification.

EMILE VAN WEYENBERGH.